United States Patent
Takebe (10) Patent No.: US 7,725,123 B2
(45) Date of Patent: May 25, 2010

(54) CELLULAR WIRELESS UNIT

(75) Inventor: Hiroyuki Takebe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/580,270

(22) PCT Filed: Nov. 10, 2004

(86) PCT No.: PCT/JP2004/016633

§ 371 (c)(1),
(2), (4) Date: May 25, 2006

(87) PCT Pub. No.: WO2005/053089

PCT Pub. Date: Jun. 9, 2005

(65) Prior Publication Data

US 2007/0105602 A1      May 10, 2007

(30) Foreign Application Priority Data

Nov. 26, 2003    (JP)    ................ 2003-396085

(51) Int. Cl.
*H04M 1/00*   (2006.01)
(52) U.S. Cl. .............. 455/550.1; 455/129; 455/575.7; 455/562.1; 455/575.1; 455/575.3; 455/575.5; 343/846; 343/848; 343/860; 343/702
(58) Field of Classification Search .............. 455/129, 455/550.1, 562.1, 575.1, 575.3, 575.5, 575.7; 343/846, 848, 860, 702
See application file for complete search history.

(56) References Cited

U.S. PATENT DOCUMENTS 5,014,346 A    5/1991   Phillips et al.

(Continued)

FOREIGN PATENT DOCUMENTS

JP    1-198121 A    8/1989

(Continued)

*Primary Examiner*—Lana N Le
*Assistant Examiner*—Ping Y Hsieh
(74) *Attorney, Agent, or Firm*—Birch, Stewart, Kolasch & Birch, LLP (57) ABSTRACT

Antenna characteristics of a folding cellphone are adjusted to appropriate values. The cellphone includes a first casing 10*a* containing a first circuit member 15*a*, and a second casing 10*b* containing a second circuit member 15*b*. The first circuit member 15*a* and the second circuit member 15*b* are connected by a connection structure consisting of a first connecting conductor 23*a* extending from each lateral end of the first circuit member 15*a* downward (toward the second casing), and a second connecting conductor 25*a* extending from each lateral end of the second circuit member 15*b* upward (toward the first casing). The first circuit member 15*a* and the second circuit member 15*b* are each comprised of shields, substrates, and so on. Antenna 111 is disposed at an upper edge of the first casing 10*a*. The effective casing length is affected by the length of the first casing 10*a* and the second casing 10*b*, which are both electrically conductive. The end of the first connecting conductor 23*a* is formed by a first circular portion 31*a* having a circular opening 31*c*. The second connecting conductor 25*a* has a second circular portion 31*b* and an opening 31*d* at the tip thereof, which are shaped similarly to those of the first connecting conductor 23*a*. A spacer 27*a* made of an insulator is inserted between the first and second connecting conductors.

5 Claims, 11 Drawing Sheets

U.S. PATENT DOCUMENTS

| | | | |
|---|---|---|---|
| 5,508,709 A | 4/1996 | Krenz et al. | |
| 5,995,052 A * | 11/1999 | Sadler et al. | 343/702 |
| 7,269,440 B2 * | 9/2007 | Ueda | 455/552.1 |
| 7,283,853 B2 * | 10/2007 | Kanazawa et al. | 455/575.1 |
| 7,310,536 B2 * | 12/2007 | Desclos et al. | 455/550.1 |
| 2001/0044320 A1 * | 11/2001 | Ono et al. | 455/550 |
| 2003/0129950 A1 | 7/2003 | Kwak | |
| 2003/0216150 A1 | 11/2003 | Ueda | |

FOREIGN PATENT DOCUMENTS

| | | |
|---|---|---|
| JP | 6-37697 A | 2/1994 |
| JP | 6-132712 A | 5/1994 |
| JP | 6-311216 A | 11/1994 |
| JP | 7-508871 A | 9/1995 |
| JP | 11-220319 A | 8/1999 |
| JP | 2000-138522 A | 5/2000 |
| JP | 2002-217755 A | 8/2002 |
| JP | 2002-353716 A | 12/2002 |
| JP | 2003-174310 A | 6/2003 |
| JP | 2003-219003 A | 7/2003 |
| JP | 2003-219004 | 7/2003 |
| JP | 2003-258972 A | 9/2003 |
| JP | 2003-273767 A | 9/2003 |
| JP | 2003-332938 A | 11/2003 |
| JP | 2005-006096 A | 1/2005 |
| KR | 2000-0014238 | 7/2000 |
| KR | 2002-0036629 A | 5/2002 |

* cited by examiner

CELLULAR WIRELESS UNIT

TECHNICAL FIELD

The present invention relates to a cellular wireless unit and particularly to a technique for preventing the deterioration of antenna characteristics in the folding-type cellphones.

BACKGROUND ART

With the development of wireless communications technologies, significant progress has been made in the field of cellphones. The currently most popular type of cellphones are those of the so-called folding type that consist of two casings that can be rotated relative to each other and folded via a hinge in a direction such that the display unit and the input unit can be faced with each other. As compared with the initially employed straight type, the folding cellphones are foldable into a compact shape such that they can be easily carried around when not in use. This structure is very convenient as it allows the use of a large screen on the display unit for communications (see Patent Document 1, for example).

Patent Document 1: JP Patent Publication (Laid-Open) No. 06-037697 A (1994)

DISCLOSURE OF THE INVENTION

Problem to be Solved by the Invention

In the cellular wireless units, antenna current flows not only through the antenna main body but also through the casing. As a result, antenna characteristics vary greatly depending on the length of the casing even when the antenna main body used is the same. In the case of the conventional straight-type cellphones, the length of the casing changed little from one type of unit to another, and so the antenna characteristics could be easily optimized beforehand. Furthermore, there was no change in the length of the casing between when not in use (during standby) and when in use (during a call), and so there has been no need to consider the change in the length of the casing.

Figure 15:
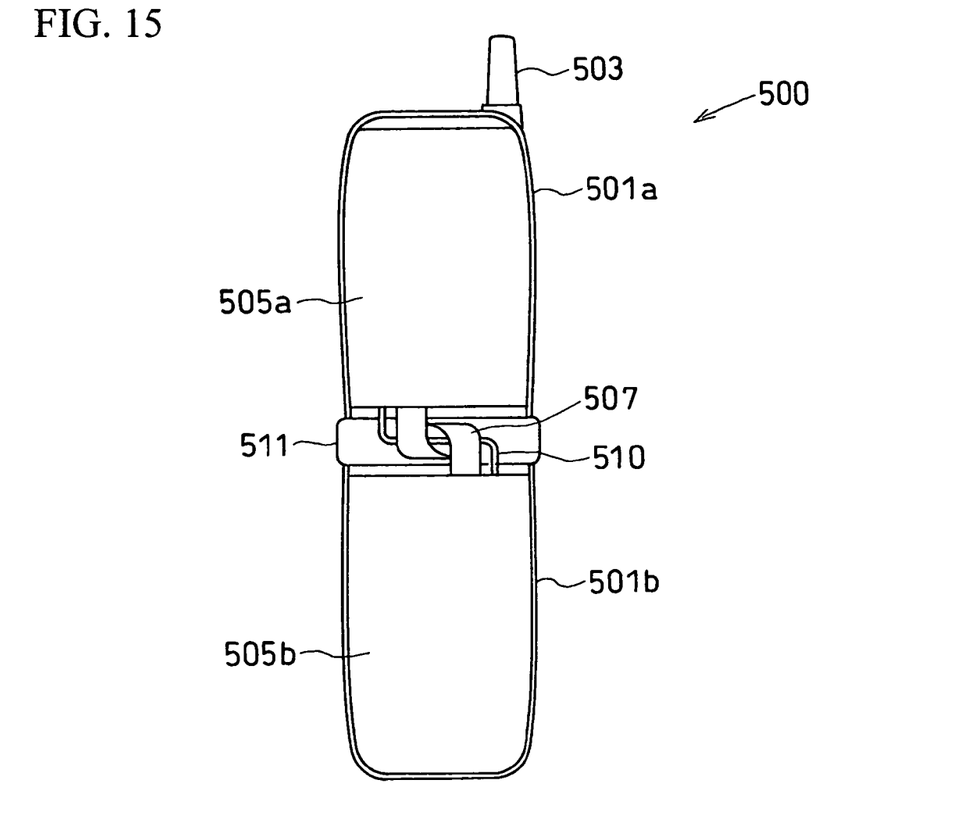
FIG. 15 is a schematic illustration of a conventional folding cellphone.

FIG. 15 is a schematic illustration of a conventional folding cellphone. As shown in FIG. 15, a conventional folding cellphone 500 includes a first casing 501a and a second casing 501b that are coupled with each other at their individual edges (namely, at a lower edge of the first casing 501a and an upper edge of the second casing 501b) via a hinge 511 such that the casings can be rotated relative to each other in a hinged manner. The first casing 501a contains a first circuit member 505a, while the second casing 501b contains a second circuit member 505b. At the upper edge of the first casing 501a, an antenna 503 is mounted. Electrical connection between the first casing 501a and the second casing 501b is provided by a coaxial cable 510 and a connecting flexible substrate 507 that communicate between the first circuit member 505a and the second circuit member 505b. The first casing 501a and the second casing 501b can be rotated around the hinge 511 as their rotational axis, relative to each other.

In such folding cellphones, while casings with a variety of lengths can be designed, antenna characteristics also vary depending on the length of the casing. In addition, the considerable change in the length of the casing between when not in use and when in use makes it difficult to optimize the antenna characteristics.

It is an object of the invention to provide a technique for adjusting antenna characteristics to appropriate values in folding cellphones.

Means for Solving the Problem

In a cellular wireless unit of the clamshell type consisting of two casings, a connecting conductor is disposed in each casing so that the electric length of the casing can be adjusted by controlling the capacitance of the connecting conductor, thereby preventing the reduction of antenna efficiency.

In one aspect, the invention provides a folding cellphone comprising a first casing containing a first circuit member, a second casing containing a second circuit member, an antenna disposed at one end of the first casing, and a hinge portion via which the other end of the first casing and one end of the second casing are connected such that the first casing and the second casing can be rotated relative to each other in a hinged manner. The folding cellphone further comprises: a first connecting conductor connected to the first circuit member at the other end thereof, and a second connecting conductor connected to the second circuit member at the one end thereof. The first connecting conductor and the second connecting conductor are disposed at least partly opposite to each other at a certain interval.

For example, the antenna characteristics can be improved by optimizing the casing length formed by the first casing and the second casing (i.e., by bringing it closer to $\lambda/4$) through the capacitance formed by the first and second connecting conductors.

A magnetic member may be disposed in proximity to the electric connecting means between the first circuit member and the second circuit member.

By disposing a magnetic member in proximity to the connecting means, the inductive property formed by the connecting means can be enhanced, and the frequency characteristics of the electric length of the first and second casings, which is determined by the capacitance formed by the first and second connecting conductors, can be widened. In this way, widerband antenna characteristics can be obtained.

Preferably, the first and second opposing portions are disposed such that a direction normal thereto is substantially parallel to the direction in which the hinge portion extends. They also preferably include a ring-shape portion or a part thereof having an opening in which a pin constituting the hinge portion is inserted.

By forming the first and second connecting conductors as ring-shape conductors, it becomes possible to dispose the axle of the hinge within the ring-shape portion so that the connecting conductors can be fixedly disposed and the variations in capacitance can be reduced.

Preferably, the first and the second connecting conductors include a first and a second opposing portion that are disposed opposite to each other at the hinge portion. Preferably, an insulator is disposed between the first opposing portion and the second opposing portion.

The first and the second connecting conductors may be disposed at both ends of the hinge portion. The connecting conductors may be opposed to each other at different intervals at the ends. The connecting conductors may be opposed to each other with different areas at the ends.

By disposing the first and second connecting conductors at both ends of the hinge portion, a left-right symmetrical distribution can be obtained in the current that flows through the first and second casings (circuit members), whereby good antenna characteristics can be obtained stably. The state of connection between the first and second casings tends to become asymmetric in the left-right direction due to the connecting flexible substrate or coaxial cables, resulting in the presence of null in the band. Such imbalance can be cancelled by varying the capacitance between the first and second connecting conductors at the left and right ends of the hinge portion.

The opposing area of the opposing portions may be changed depending on the positional relationship between the first casing and the second casing. For example, when the unit is opened, good characteristics can be obtained by connecting the first and second casings through the capacitance between the first and second connecting conductors. When the unit is closed, the connection between the first casing and the second casing can be reduced (through a reduction of the capacitance thereof) so as to reduce the influence of the second casing as it comes near the antenna (i.e., the ground condition of the second casing with respect to the antenna can be reduced).

EFFECTS OF THE INVENTION

By adjusting the length of the casing when in use and thereby bringing the effective casing length relative to the antenna closer to $\lambda/4$, good antenna characteristics (efficiency) can be maintained. Further, by optimizing the effective casing depending on the mode of use, the drop in antenna efficiency can be prevented both during a call and during standby.

BRIEF DESCRIPTION OF THE DRAWINGS

FIG. 1(A) shows a back side, and FIG. 1(B) shows a front side.

FIGS. 8(A) and (B) show a connection structure according to a third variation of the present embodiment.

FIG. 11 is a schematic illustration of a cellphone according to a third embodiment of the invention. FIG. 11(A) is a front view.

BEST MODE FOR CARRYING OUT THE INVENTION

Figure 1:
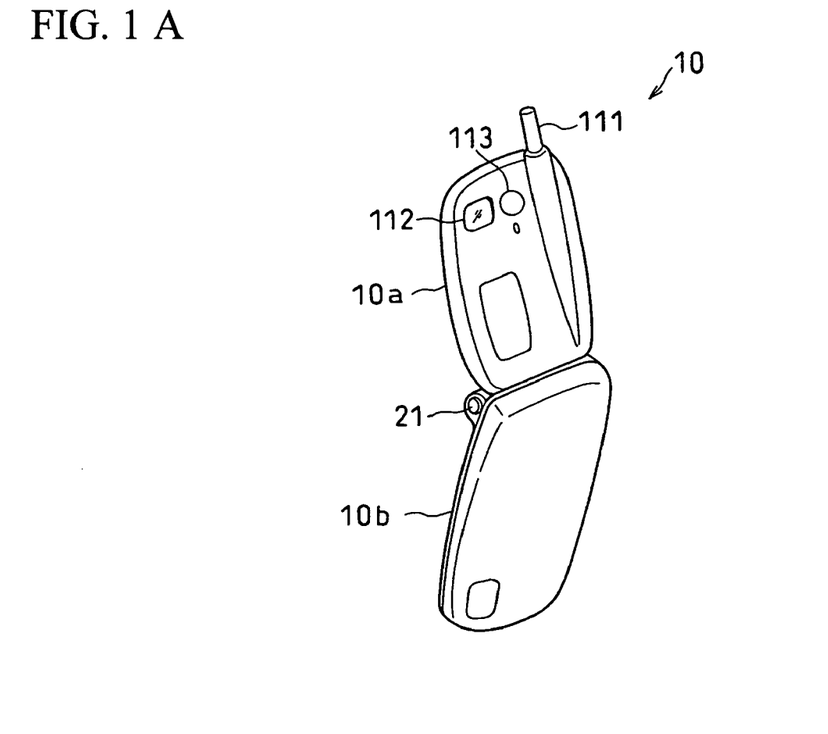
FIG. 1 shows an example of the appearance of a folding cellphone according to a first embodiment of the invention.
Figure 2:
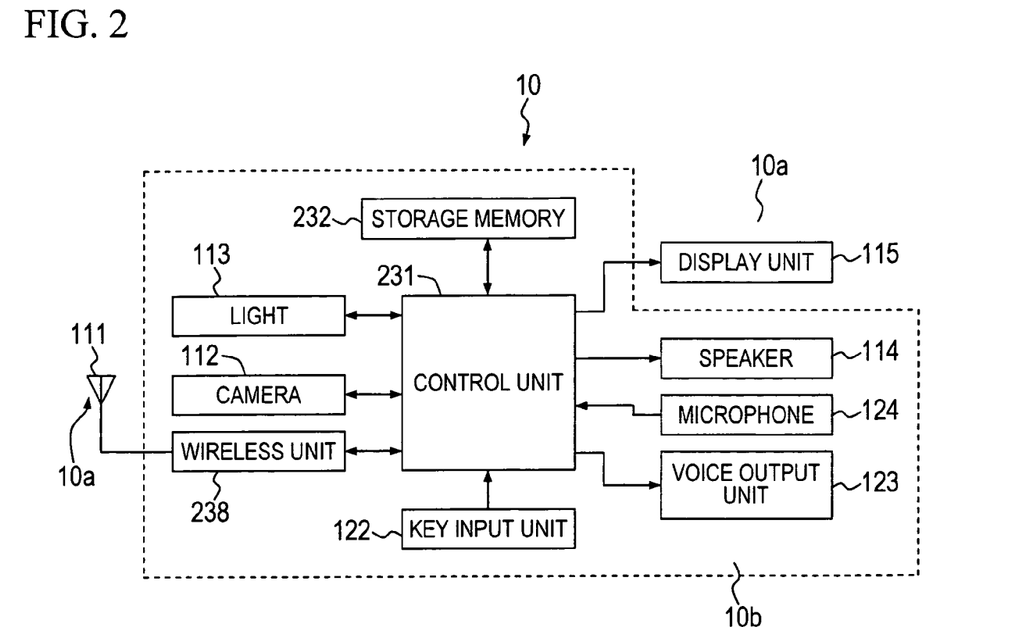
FIG. 2 shows a functional block diagram of the cellphone shown in FIG. 1.
Figure 3:
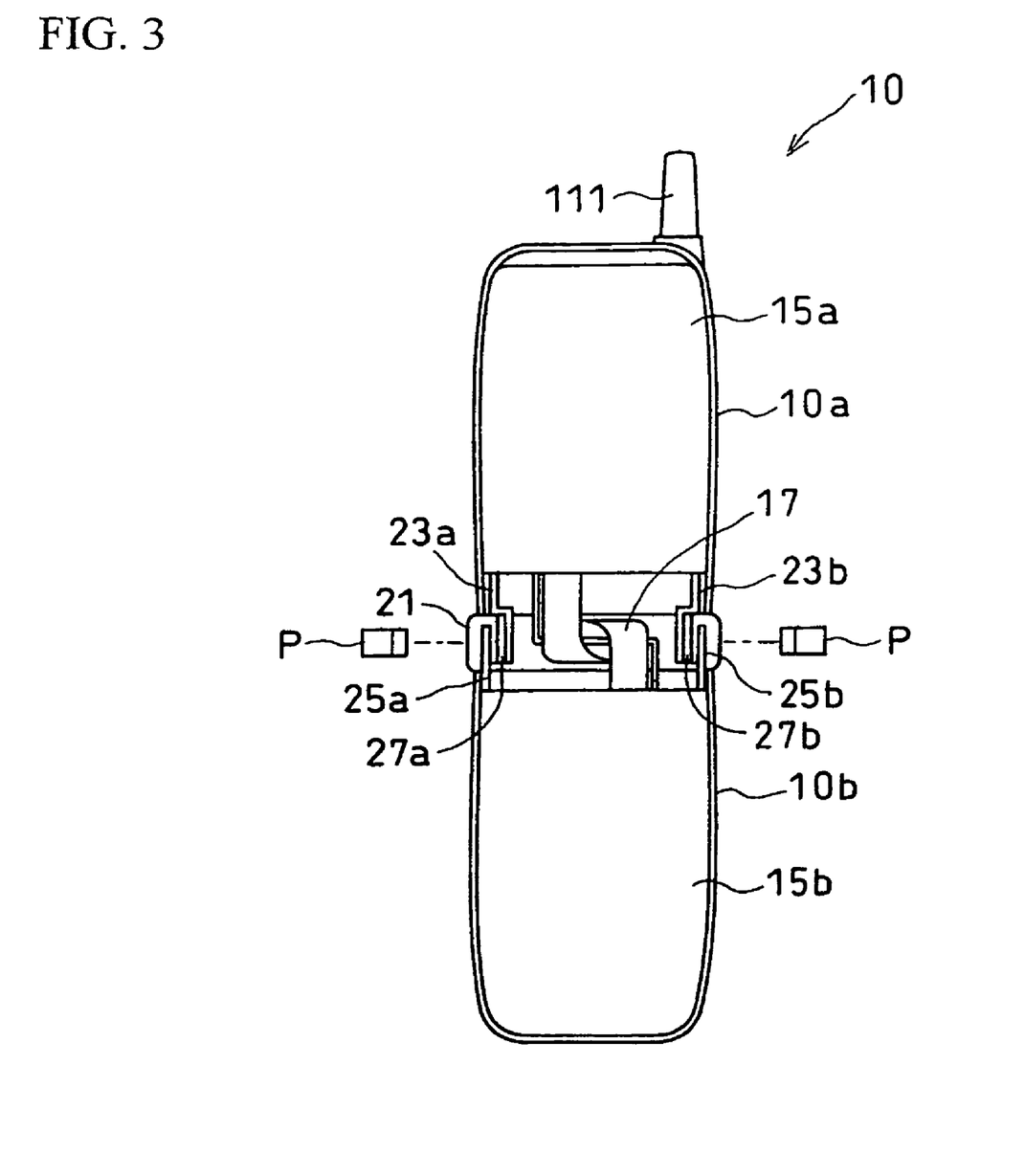
FIG. 3 shows an example of the appearance of a cellphone according to the first embodiment of the invention.

In the following, a cellphone according to embodiments of the invention will be described with reference to the drawings. FIGS. 1 to 4 show an example of the structure of the cellphone according to an embodiment. FIG. 1 shows an example of the exterior of the cellphone. FIG. 2 shows a functional block diagram of the cellphone. FIG. 3 shows an example of the internal structure of the cellphone. FIG. 4 shows the structure of a main portion of FIG. 3.

As shown in FIGS. 1(A) and (B), a folding cellphone 10 of the present embodiment includes a first casing 10a, a second casing 10b, and a hinge portion 21 for coupling them so that they can be rotated relative to each other in a hinged manner. As shown in FIG. 1(B), on the surface of the first casing 10a, there is mounted an LCD display unit 115 and a speaker 123. On the other hand, the second casing 10b is provided with a variety of operation buttons 122 and a microphone 124. Further, as shown in FIGS. 1(A) and (B), an antenna 111 is provided at the upper edge of the first casing 10a (opposite the hinge 21). On the back surface shown in FIG. 1(A), a camera 112 and a light 113 are generally provided. FIG. 2 shows a functional block diagram of the cellphone 10. As shown in FIG. 2, the cellphone 10 includes a control unit 231 for performing overall control, including the control of a storage memory 232, display unit 115, speaker 114, microphone 124, key input unit 122, camera 112, light 113, wireless unit 238, and antenna 111.

As shown in FIG. 3, the internal structure of the cellphone includes a first circuit member 15a disposed in the first casing 10a. The first circuit member includes a plurality of layers of substrates, wiring layers provided between the substrates, and circuit elements, the first circuit member 15a being electrically conductive as a whole. The cellphone also includes a second circuit member 15b disposed in the second casing 10b which similarly includes a plurality of substrates, wiring layers disposed between the substrates, and circuit elements, the second circuit member 15b electrically conductive as a whole. The first circuit member 15a and the second circuit member 15b are connected by a connection structure consisting of first connecting conductors 23a and 23b that extend from each side edge of the first circuit member 15a downward (toward the second casing) as shown, and second connecting conductors 25a and 25b that extend from each side edge of the second circuit member 15b upward (toward the first casing) as shown. The first circuit member 15a and the second circuit member 15b are comprised of shields, substrates, and so on.

The first circuit member 15a and the second circuit member 15b are electrically connected by a connecting flexible substrate 17. Thus, the operation of the unit is not interfered when the first casing 10a and the second casing 10b are rotated around the hinge portion 21 as their rotational axis, relative to each other.

Figure 4A:
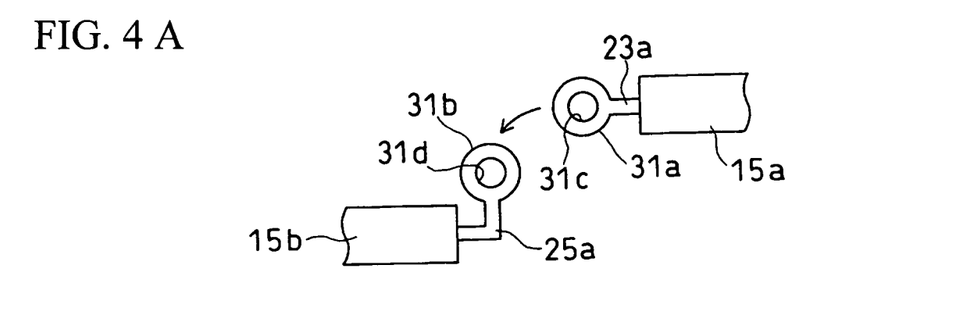
FIGS. 4(A) and (B) shows the structure of the connecting members of the cellphone according to the present embodiment.

The antenna 111 is mounted at the upper edge of the first casing 10a. The antenna characteristics, which greatly depend on the effective length of the casing (the first casing 10a and the second casing 10b) relative to the antenna 111, need to be carefully considered. In the cellphone 10 of the present embodiment, as shown in FIG. 4(A), the first connecting conductor 23a is provided to protrude from the end of the first circuit member 15a. At the end of the first connecting conductor 23a, there is formed a first circular portion 31a having a circular opening 31c. The second connecting conductor 25a includes a second circular portion 31b and an opening 31d at the tip thereof, which are shaped identically to those of the first connecting conductor 23a. A pin member P (FIG. 3) can be inserted in the openings 31c and 31d, forming a hinge.

Figure 4B:
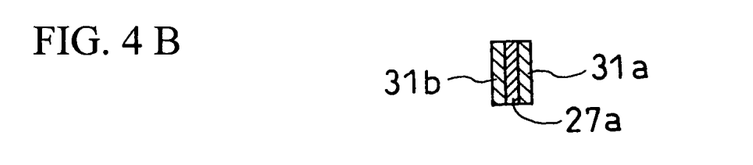

As shown in FIGS. 3 and 4(B), between the opposite planes of the first circular portion 31a and the second circular portion 31b, there is inserted a spacer 27a formed of, e.g., an insulating material in a shape such that it allows the passage of the pin member P (FIG. 3). Alternatively, these circular members may be simply placed at an interval (i.e., they are disposed opposite to each other with air between them).

In this structure, the drop in antenna efficiency can be prevented by adjusting the electric length of the casing to λ/4 with respect to the antenna 111. The effective casing of the folding cellphone, which varies depending on the type of the device or the mode of use, can be adjusted to an appropriate value by means of the above-described opposing structures. The effective casing can be adjusted freely to a certain extent by the distance between the opposing structures and the dielectric constant of the insulator inserted between them.

Figure 5:
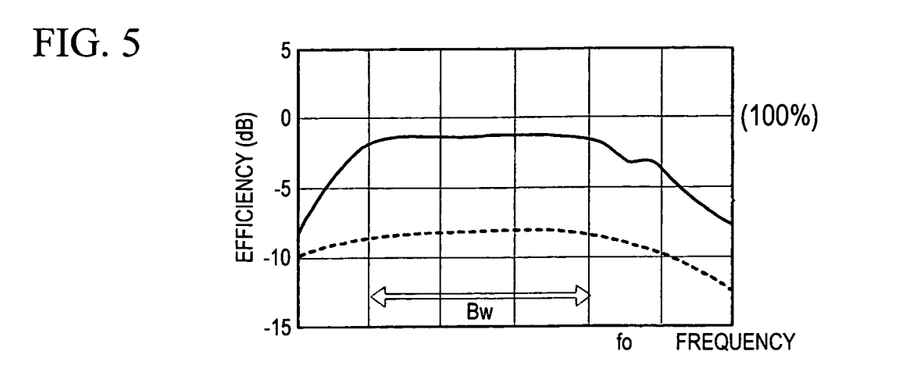
FIG. 5 shows an example of the frequency characteristics of the efficiency of the cellphone according to the present embodiment.

FIG. 5 shows an example of the frequency characteristics of the efficiency of the cellphone. As shown in FIG. 5, the figure shows a comparison of a case not involving the above-described adjustment (broken line) and a case involving such adjustment (solid line). As shown in FIG. 5, the efficiency can be greatly improved within the operating frequency band Bw by performing the adjustment. For example, in the example shown in FIG. 5, the efficiency of approximately −8 dB has been improved to approximately −2 dB by the adjustment, thus exhibiting a great improvement.

As described above, by adjusting the effective antenna adjustment portion between the first and the second casing, which depends on the length of the casing, so that the antenna length equals λ/4, the efficiency in the operating frequency band can be improved with a simple structure. It is noted that an advantage can be obtained that, when the capacitance is adjusted using the insulator, the hinged rotational motion of the cellphone is not interfered because of the provision of the opening through which a pin can be inserted.

The adjusting capacitance (insulator) may be provided to either the first and the second connecting conductors 23a and 25a, which are provided on one side, or the first and the second connecting conductors 23b and 25b, which are provided on the other side, or both.

Figure 6A:
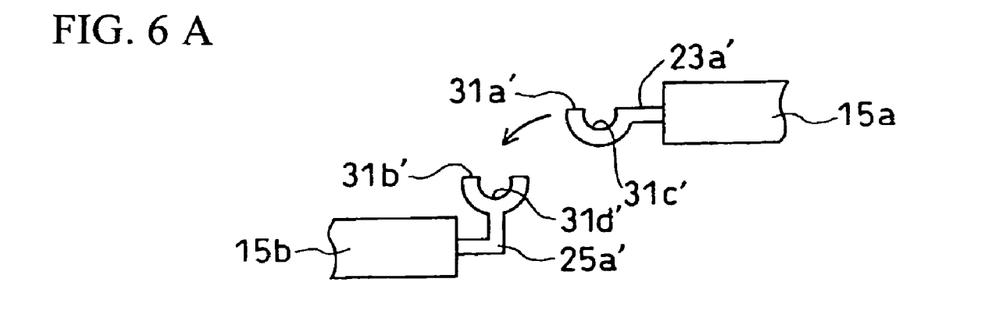
FIGS. 6(A) and (B) shows an example of a connection structure according to a first variation of the present embodiment.
Figure 6B:
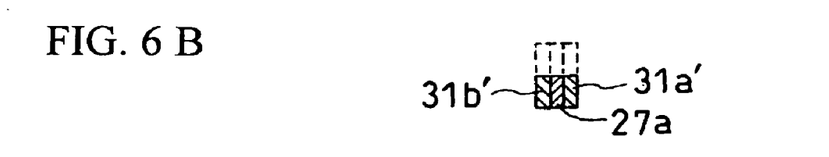

In the following, a first variation of the present embodiment will be described with reference to the drawings. FIGS. 6(A) and (B) shows an example of the connection structure in the first variation. The structure shown in FIG. 6 differs from that of FIG. 4 in that a first connecting member 23a' and a second connecting member 25b' are both substantially semicircular in shape. The semicircular connecting members are partly provided with a semicircular groove. Thus, by disposing these semicircles having the groove, opposite to each other at an interval and inserting the insulator 27a between them, the capacitance can be adjusted.

Figure 7A:
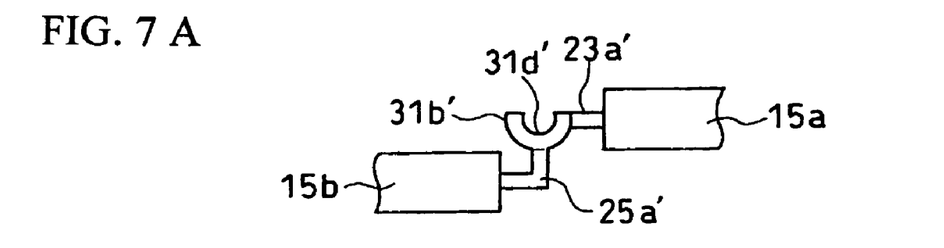
FIGS. 7(A) and (B) shows a connection structure according to a second variation of the present embodiment.
Figure 7B:
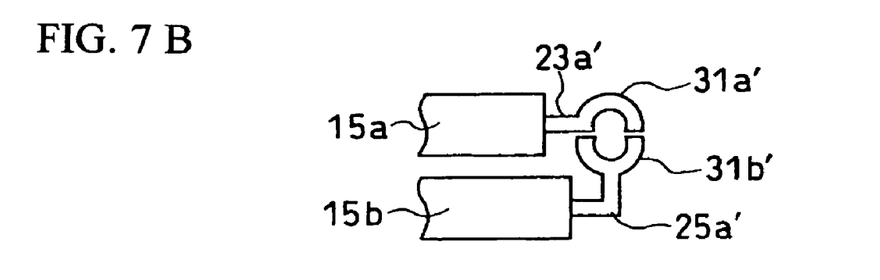

Hereafter a second variation of the present embodiment will be described with reference to the drawings. FIGS. 7(A) and (B) illustrates how the positional relationship between a first connecting member 31a' and a second connecting member 31b' changes in the embodiment involving the use of the cellphone having the structure shown in FIG. 6. FIG. 7(A) shows their positional relationship when the cellphone is opened (during a call), while FIG. 7(B) shows the relationship when the cellphone is closed (during standby). As shown in FIGS. 7(A) and (B), when the cellphone is opened, the first connecting member 31a' and the second connecting member 31b' are oppositely positioned. When the cellphone is closed, the first connecting member 31a' and the second connecting member 31b' are positioned such that they are not opposite each other. Namely, the capacitive adjustment is made when the cellphone is opened. By adopting such structure, the presence or absence of the capacitive adjustment can be switched depending on the mode of use of the cellphone so as to adjust the effective antenna length depending on the mode of use of the cellphone. Alternatively, the adjustment can be made such that an intermediate value is obtained, rather than the simple choice between the presence or absence of adjustment as shown in FIG. 7.

Figure 8:
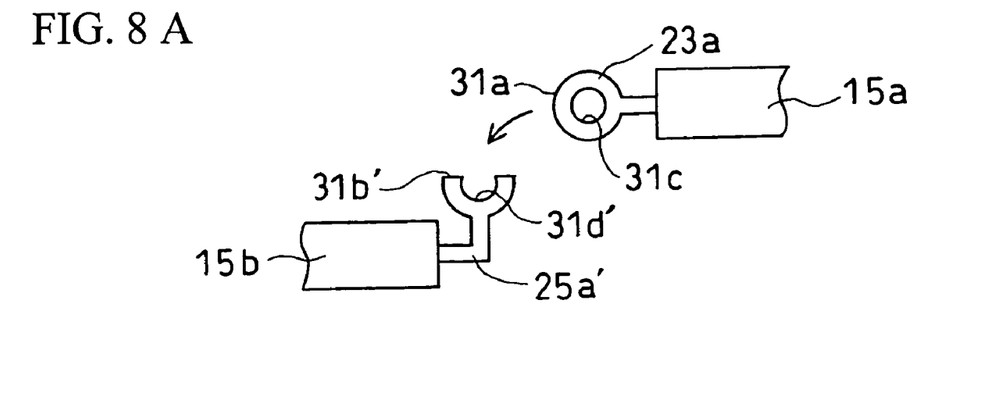

Hereafter a third variation of the present embodiment will be described with reference to the drawings. As shown in FIGS. 8(A) and (B), the cellphone according to the third variation includes a first connecting member 31a that is circular (doughnut-shaped) and a second connecting member 31b' that is semicircular. The insulator is provided between the opposing portions. This structure allows the capacitive adjustment depending on the shape of the second connecting member 31b'.

Thus, in accordance with the cellphone of the foregoing embodiment, the capacitance adjusting mechanism provided at the hinge allows the effective casing to be adjusted in a direction that prevents the drop of antenna efficiency, without interfering with the use of the folding cellphone. Furthermore, the capacitance can be adjusted depending on the mode of use in terms of folding, so that the drop of efficiency can be advantageously prevented regardless of the condition of use.

Figure 9:
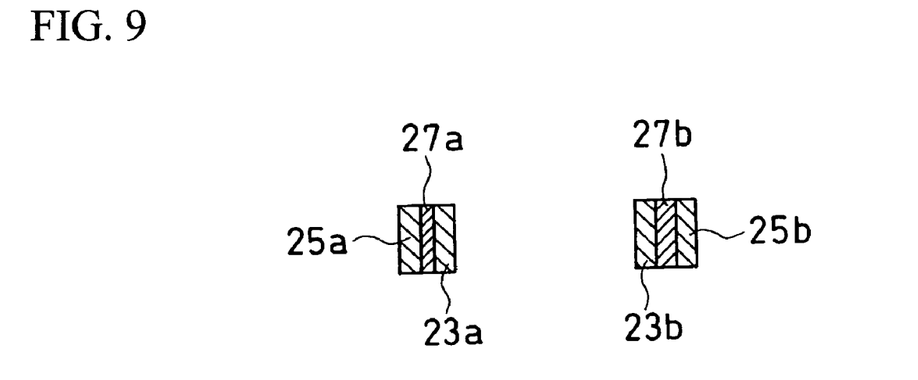
FIG. 9 shows an example of a main portion of the cellphone according to a second embodiment of the invention, which corresponds to FIG. 4(B) relating to the cellphone according to the first embodiment.

Hereafter, a cellphone according to a second embodiment of the invention will be described with reference to the drawings. FIG. 9 shows an example of the structure of the cellphone according to the present embodiment, the figure corresponding to FIG. 3 relating to the cellphone according to the first embodiment. As shown in FIG. 9, the cellphone of the present embodiment is characterized in that different capacitances are given to a first connecting conductor 23a and a second connecting conductor 25a provided on one side, and a first connecting conductor 23b and a second connecting conductor 25b provided on the other side. The different capacitances can be provided by various methods. Examples include a method employing insulators 27a and 27b having different thicknesses (FIG. 9), a method employing insulators having different dielectric constants, and a method employing different opposite areas between the opposing portions.

Figure 10:
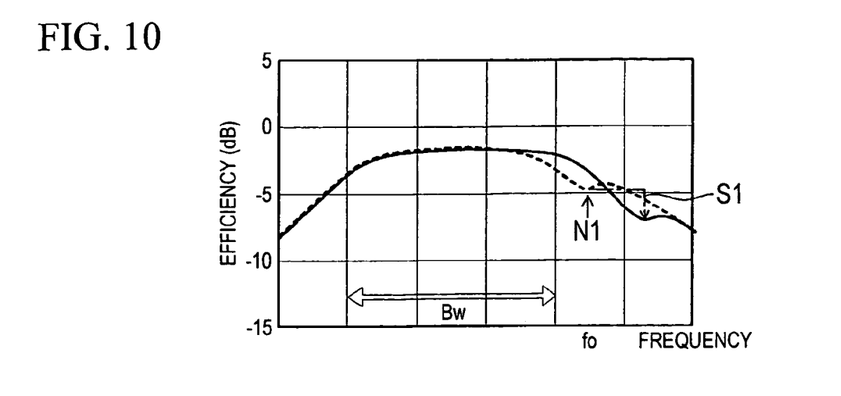
FIG. 10 shows the frequency dependency of antenna efficiency when the cellphone according to the second embodiment is used.

FIG. 10 shows the frequency dependency of antenna efficiency in the case of the cellphone according to the present embodiment. As shown in FIG. 10, where the broken line indicates the frequency dependency of efficiency, when a localized efficiency drop (null) N1 is present in a region near the operating frequency band Bw, it is possible to displace the frequency band having the local efficiency drop in the direction of the frequency S1, which is away from the operating frequency band, by varying the capacitance between the sides. Thus, an advantage can be obtained that the drop in effective efficiency can be prevented.

Figure 11A:
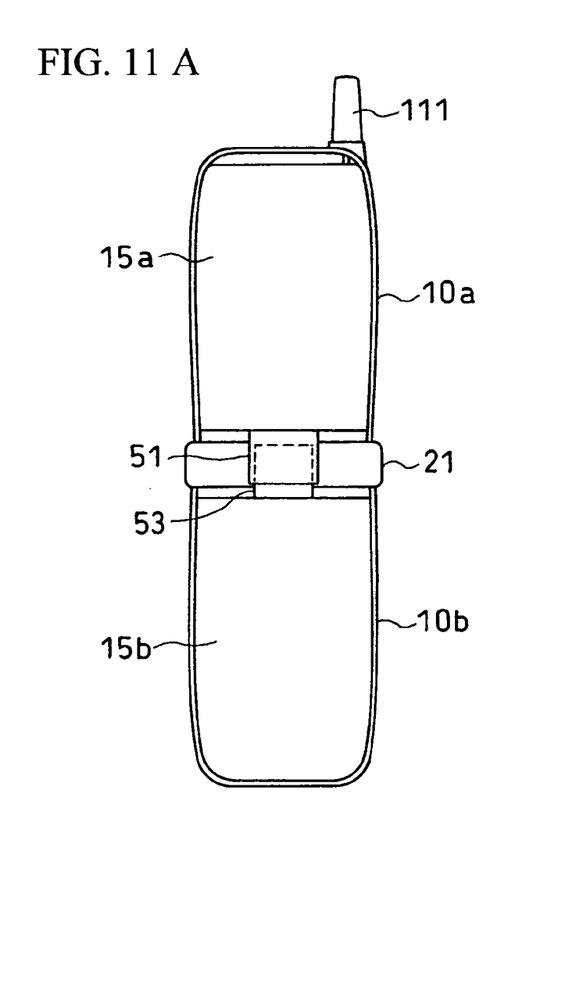
Figure 11B:
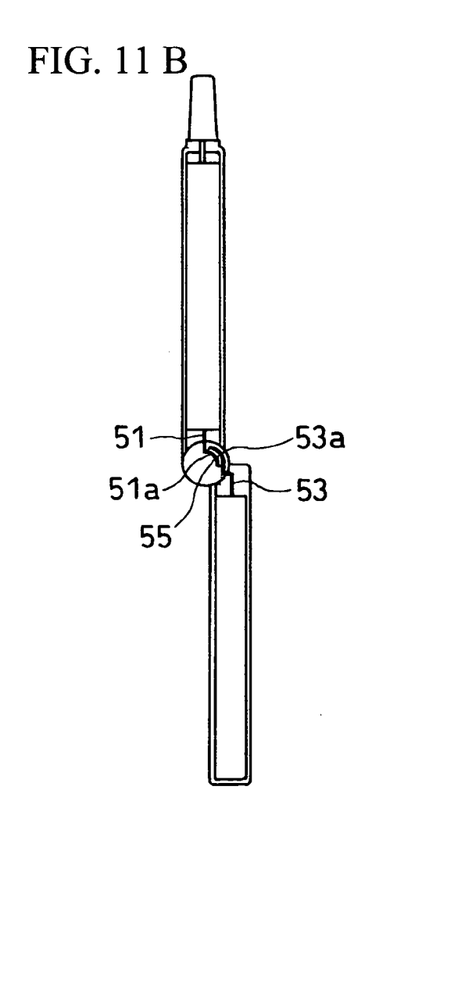
FIG. 11(B) is a side view, both of which show an open state when in use (during a call).
Figure 12:
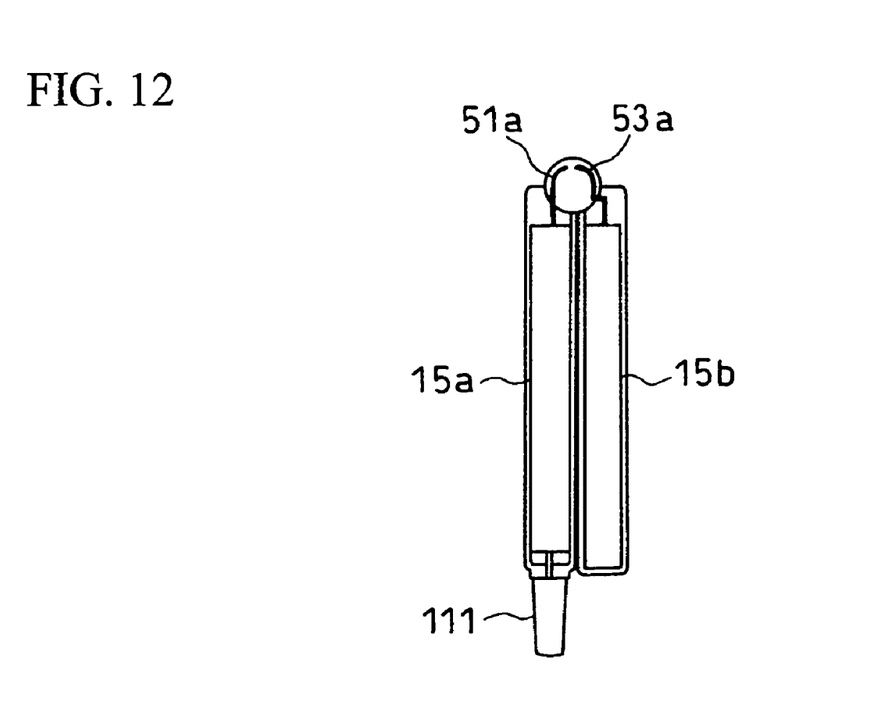
FIG. 12 is a schematic illustration of the cellphone according to the present embodiment when not in use (during standby).

Hereafter, a cellphone according to a third embodiment of the invention will be described with reference to the drawings. FIG. 11 is a schematic illustration of the cellphone according to the embodiment. FIG. 11(A) is a front view and FIG. 11(B) is a side view, both views showing the cellphone that is opened when in use (during a call). FIG. 12 is a schematic illustration of the cellphone when not in use (during standby).

As shown in FIGS. 11(A) and (B), the cellphone according to the present embodiment includes a first casing 10a, a second casing 10b, and a hinge portion 21 by which the casings are hinged together so as to be rotatable relative to each other. The first casing 10a contains a first circuit member 15a comprised of shields, substrates, and so on. An antenna 111 is mounted at the upper edge of the first casing 10a. The second casing 10b is coupled with the first casing 10a at the lower edge thereof via the hinge portion 21 such that it can be opened and closed. The second casing 10b similarly contains a second circuit member 15b comprised of shields, substrates, and so on. The cellphone according to the present embodiment differs from the cellphone of the first embodiment (see FIGS. 3(A) and (B)) in that a first connecting conductor 51 and a second connecting conductor 53 are attached at the center of the cellphone in the width direction thereof. As shown in FIG. 11(B), the hinge portion 21 includes a first bend portion 51a and a second bend portion 53a that are bent in such manner as to conform to the inner surface of the hinge. The first bend portion 51a and the second bend portion 53a are adapted such that their opposing area changes as the angle made by the first casing 10a and the second casing 10b changes. When in use, the angle made by the first casing 10a and the second casing 10b is substantially 180°, so that the first bend portion 51a and the second bend portion 53a are disposed with their substantially entire surfaces facing each other at a certain interval. An insulator (dielectric member 55) may be inserted in the interval, or only air may be present there. The capacitance between the first bend portion 51a and the second bend portion 53a can be adjusted by the dielectric constant of the insulator 55 and the opposing area between the first bend portion 51a and the second bend portion 53a.

As shown in FIG. 12, when not in use (during standby), the angle made by the first casing 10a and the second casing 10b is substantially zero, such that the first bend portion 51a and the second bend portion 53a are not opposite to each other. In this case, the bend portions may be disposed partly opposite to each other. In any case, the present embodiment is similar to the first embodiment in that the opposing area is changed depending on the state of use so that an appropriate antenna length can be obtained for a particular state of use.

Figure 17:
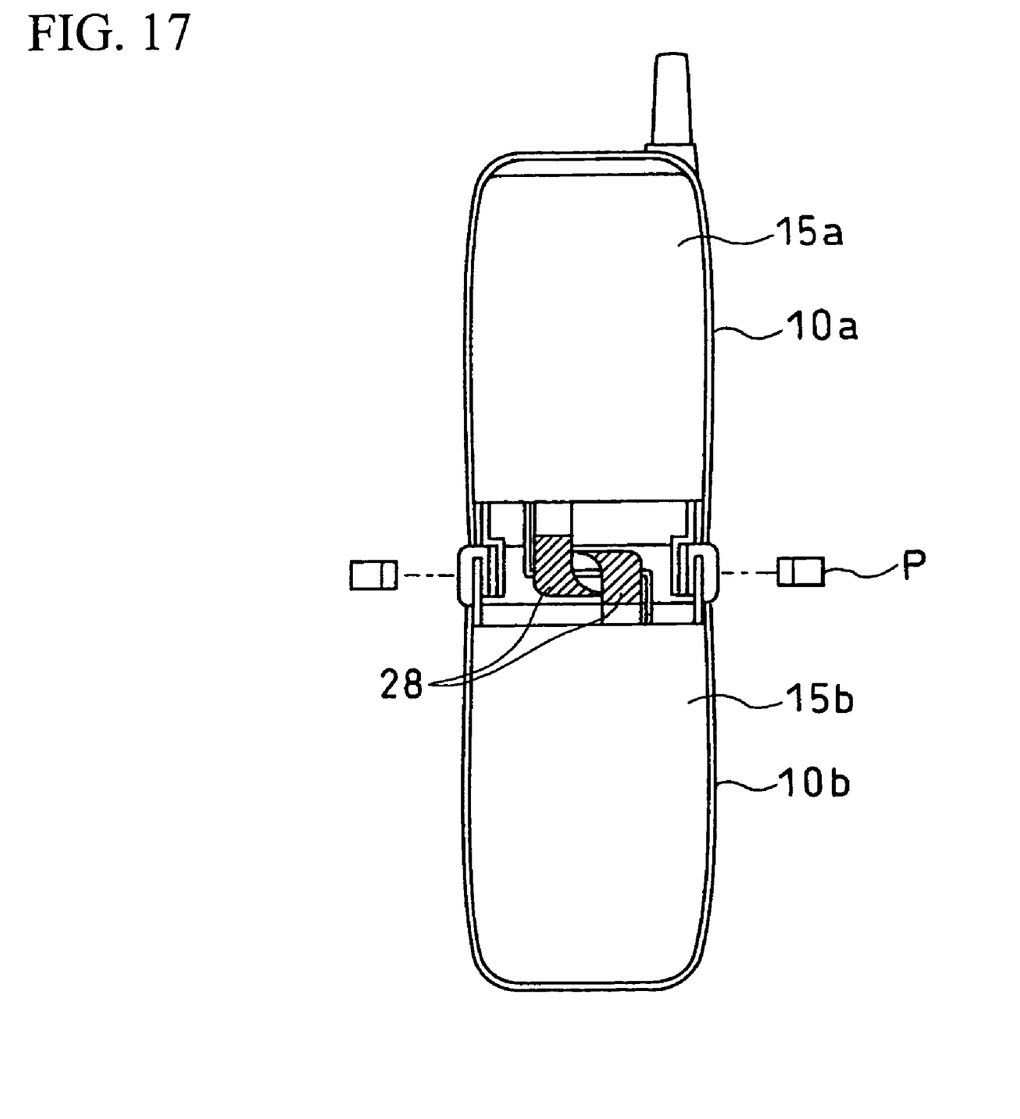
FIG. 17 is a schematic illustration of a cellphone according to the fourth embodiment of the invention.

Hereafter, a cellphone according to a fourth embodiment of the invention will be described with reference to FIG. 17. As shown in FIG. 17, the cellphone according to the present embodiment is structured similarly to the structure shown in FIG. 3. It is characterized, however, in that a magnetic member 28 is affixed to at least one of the top surface and the back surface of a flexible substrate 17, for example. The magnetic member 28 may be in the form of a tape that is affixed to the flexible substrate 17, for example.

Figure 13:
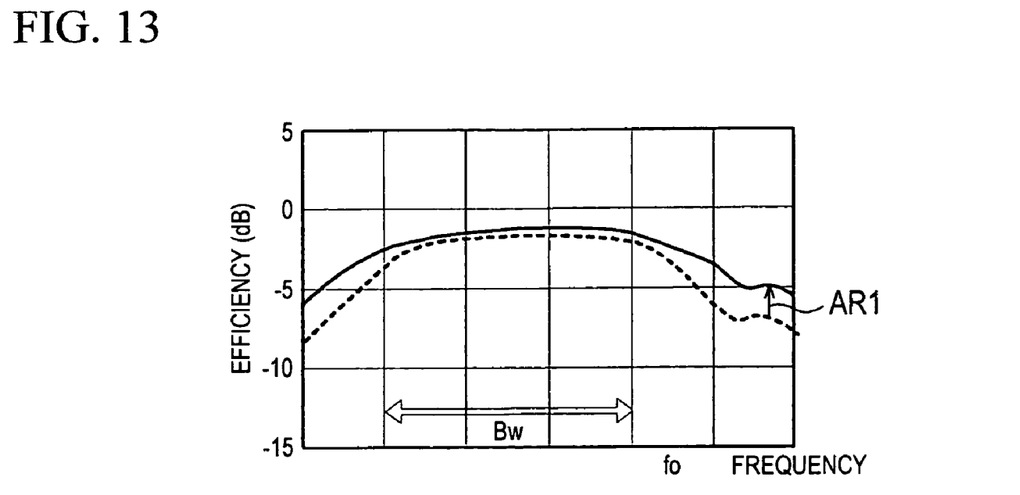
FIG. 13 shows the frequency dependency of the efficiency of a cellphone according to a fourth embodiment.

FIG. 13 shows the frequency dependency of antenna efficiency when the cellphone according to the present embodiment is used. The characteristics shown in FIG. 13, in which the frequency dependency of antenna efficiency when the magnetic member 28 is not disposed is indicated by the broken line, indicate that, by mounting the magnetic member 28 in proximity to the electric connecting means between the first circuit member 15a and the second circuit member 15b, the inductive property produced by the connecting means can be enhanced, and the frequency characteristics of the electric length of the first and second casings 10a and 10b, which is determined by the capacitance provided by the first and second connecting conductors, can be widened. In this way, a wider band can be obtained for the frequency dependency of antenna efficiency, as shown by the solid line.

Figure 14:
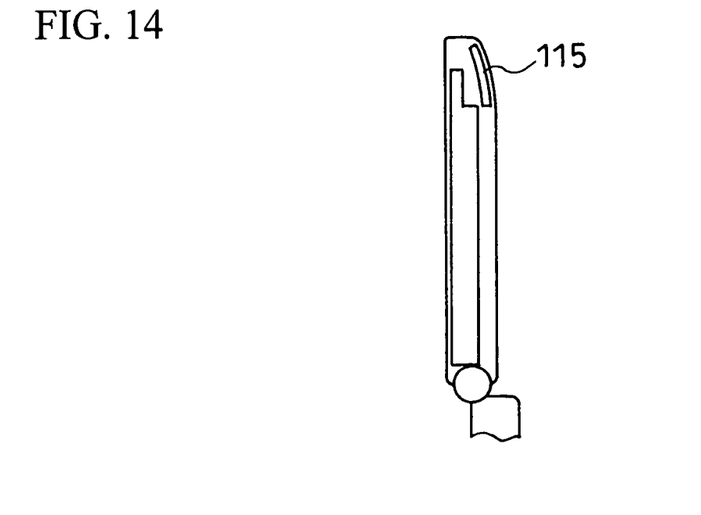
FIG. 14 is a schematic illustration of a cellphone having a built-in antenna.

The cellphone according to any of the foregoing embodiments can also be applied to a cellphone having a built-in antenna 115 shown in FIG. 14.

Figure 16:
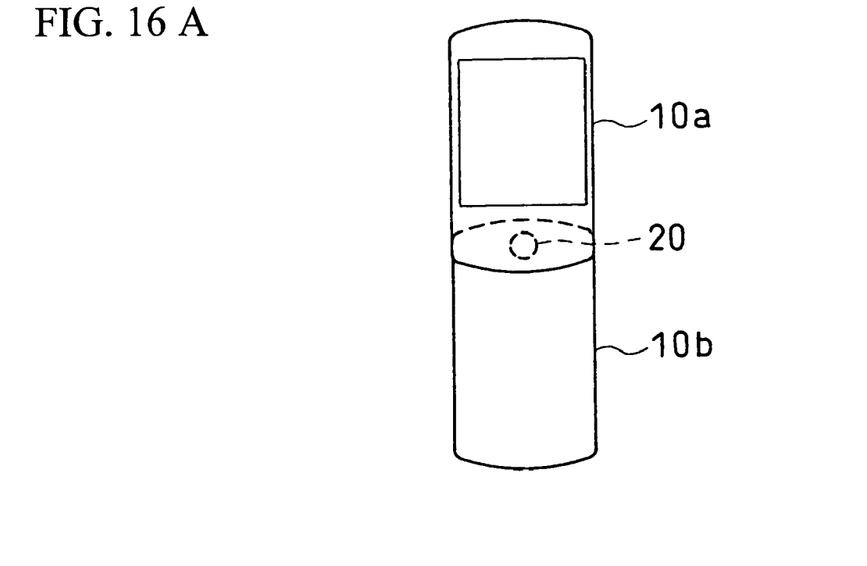
FIG. 16(A) to (C) shows an example where the invention is applied to a cellphone designed such that the casing can be rotated in a plane parallel to the plane of the display.

In the cellphone according to the foregoing embodiments, the first 10a and second casings 10b are hinged together at their lower and upper edges thereof and are moved relative to each other such that the display unit and the input unit are folded to face each other as shown in FIG. 3. Alternatively, however, the cellphone may have a rotating axle 20 that penetrates the cellphone where the first casing 10a and the second casing 10b are connected, in a direction parallel to the normal to the plane of display, allowing the first casing 10a and the second casing 10b to be rotated in a plane parallel to the display plane, as shown in FIGS. 16(A) to 16(C). In this case, too, the capacitance of the connecting portion between the first casing 10a and the second casing 10b is adapted to vary between the operational state of FIG. 16(A), the standby state of FIG. 16(C), and the transitional state shown in FIG. 16(B) between them, as in the cellphone according to any of the foregoing embodiments. In the present example, the modes shown in FIGS. 7(A) and (B) may be adopted such that the opposing portions look like as shown in FIG. 7(A) when the cellphone is in the state of FIG. 16(A) and as shown in FIG. 7(B) when it is in the state of FIG. 16(B). It goes without saying that the invention can also be applied to those cellphones where the first casing and the second casing are slidably engaged.

In essence, the invention is applicable to all those cellphones or portable terminals that are constructed such that, when the figure of the casing is changeable, the effective casing can be changed in a direction such that the drop of antenna efficiency can be prevented depending on the change in the figure.

The foregoing embodiments mainly involved a capacitive method as a way to adjust the antenna length. In reality, however, inductive adjustment can also be made, and the preceding embodiments do not limit the method for adjusting the effective antenna length. The invention is also applicable to any terminal (cellular wireless unit) that uses an antenna for communications and is not limited to cellphones alone.

INDUSTRIAL APPLICABILITY

The invention can be effectively utilized for preventing the drop in antenna efficiency in cellular wireless units including cellphones.

The invention claimed is:

1. A wireless unit comprising a first casing containing a first circuit member, a second casing containing a second circuit member, an antenna disposed at one end of said first casing, and a connecting portion via which the other end of said first casing and one end of said second casing are connected such that said first casing and said second casing can be rotated relative to each other in a hinged manner, said wireless unit further comprising:

a first connecting conductor connected to said first circuit member at said other end thereof, and a second connecting conductor connected to said second circuit member at said one end thereof and capable of being electrically connected to said first connecting conductor through an insulator or air, wherein one plane A of said first connecting conductor and one plane B of said second connecting conductor oppose each other with the insulator or air therebetween such that the plane A and the plane B are disposed at a certain interval, wherein the connecting portion is a hinge, and the normal direction of plane A of said first connecting conductor and the normal direction of plane B of said second connecting conductor are substantially parallel to the axial direction of the hinge.

2. A wireless unit comprising a first casing containing a first circuit member, a second casing containing a second circuit member, an antenna disposed at one end of said first casing, and a connecting portion via which the other end of said first casing and one end of said second casing are connected such that said first casing and said second casing can be rotated relative to each other in a hinged manner, said wireless unit further comprising:
- a first connecting conductor connected to said first circuit member at said other end thereof,
- a second connecting conductor connected to said second circuit member at said one end thereof and capable of being electrically connected to said first connecting conductor through an insulator or air, wherein one plane A of said first connecting conductor and one plane B of said second connecting conductor oppose each other with the insulator or air therebetween such that the plane A and the plane B are disposed at a certain interval,
- a third connecting conductor connected to said first circuit member at said other end, and
- a fourth connecting conductor connected to said second circuit member at said one end thereof and capable of being electrically connected to said third connecting conductor through the insulator or air, wherein one plane C of the third connecting conductor and one plane D of the fourth connecting conductor oppose each other with the insulator or air therebetween such that the plane C and the plane D are disposed with a certain interval.

3. The wireless unit according to claim 2, further comprising a connecting substrate to connect said first circuit member and said second circuit member, wherein said connecting substrate and said first circuit member connects between said first connecting conductor and said third connecting conductor, or
said connecting substrate and said second circuit member connects between said second connecting conductor and said fourth connecting conductor.

4. The wireless unit according to claim 2, wherein the first opposite interval between said surface A of said first connecting conductor and said surface B of said second connecting conductor and the second opposite interval between said surface C of said third connecting conductor and said surface D of said fourth connecting conductor is different.

5. The wireless unit according to claim 2, wherein the first opposite area between said surface A of said first connecting conductor and said surface B of said second connecting conductor and the second opposite area between said surface C of said third connecting conductor and said surface D of said fourth connecting conductor is different.

* * * * *